US012367524B2

(12) United States Patent
Sundaramoorthy et al.

(10) Patent No.: US 12,367,524 B2
(45) Date of Patent: *Jul. 22, 2025

(54) SETTINGS OPTIMIZATION ENGINE USING ARTIFICIAL INTELLIGENCE TO ENHANCE CLIENT PRIVACY

(71) Applicant: Bank of America Corporation, Charlotte, NC (US)

(72) Inventors: Crystal M. Sundaramoorthy, Charlotte, NC (US); Elena Kvochko, New York, NY (US); Albena N. Fairchild, Spruce Pine, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 187 days.

This patent is subject to a terminal disclaimer.

(21) Appl. No.: 18/226,908

(22) Filed: Jul. 27, 2023

(65) Prior Publication Data
US 2023/0368286 A1 Nov. 16, 2023

Related U.S. Application Data

(63) Continuation of application No. 16/897,394, filed on Jun. 10, 2020, now Pat. No. 11,756,112.

(51) Int. Cl.
*G06Q 40/02* (2023.01)
*G06F 21/62* (2013.01)
(Continued)

(52) U.S. Cl.
CPC ......... *G06Q 40/02* (2013.01); *G06F 21/6245* (2013.01); *G06N 20/00* (2019.01); *G06Q 50/265* (2013.01)

(58) Field of Classification Search
CPC ...... G06Q 40/02; G06Q 50/265; G06N 20/00; G06F 21/6245
See application file for complete search history.

(56) References Cited

U.S. PATENT DOCUMENTS 8,285,681 B2 10/2012 Prahlad et al.
8,418,222 B2 4/2013 Gbadegesin et al.
(Continued)

OTHER PUBLICATIONS

Nov. 4, 2022 (US) Non-Final Office Action—U.S. Appl. No. 16/897,394.
May 23, 2023—(US) Notice of Allowance—U.S. Appl. No. 16/897,394.

*Primary Examiner* — Shewaye Gelagay
*Assistant Examiner* — Thomas A Carnes
(74) *Attorney, Agent, or Firm* — Banner & Witcoff, Ltd.

(57) ABSTRACT

Aspects of the disclosure relate to using machine learning to modify account privacy settings. A computing platform may identify initial account settings for an individual of a plurality of individuals. Using a settings optimization model, the computing platform may identify account data and third party data for the individual. Using the settings optimization model, the computing platform may identify discrepancies between the initial account settings for the first individual and account settings for a subset of the plurality of individuals having common characteristics with the individual. Based on the discrepancies, the computing platform may identify settings modifications for the individual, and may determine that a modification of the settings modifications applies to a detected interaction of the individual. The computing platform may direct an enterprise data source to perform the modification, which may cause the enterprise data source to modify the initial account settings based on the modification.

20 Claims, 15 Drawing Sheets

(51) Int. Cl.
*G06N 20/00* (2019.01)
*G06Q 50/26* (2024.01)

(56) References Cited

U.S. PATENT DOCUMENTS

| | | |
|---|---|---|
| 8,527,549 B2 | 9/2013 | Cidon |
| 8,762,642 B2 | 6/2014 | Bates et al. |
| 8,788,628 B1 | 7/2014 | Taylor et al. |
| 8,805,951 B1 | 8/2014 | Faibish et al. |
| 8,805,968 B2 | 8/2014 | Taylor et al. |
| 8,832,820 B2 | 9/2014 | Barjatiya et al. |
| 8,850,130 B1 | 9/2014 | Aron et al. |
| 9,147,195 B2 | 9/2015 | Sivaramakrishnan et al. |
| 9,256,374 B1 | 2/2016 | Aron et al. |
| 9,398,087 B1 | 7/2016 | Hosie et al. |
| 9,424,437 B1 | 8/2016 | Ancin et al. |
| 9,454,398 B2 | 9/2016 | Hacker |
| 9,565,200 B2 | 2/2017 | Bacastow et al. |
| 10,282,553 B1 * | 5/2019 | Schroeder ............ G06F 18/217 |
| 10,523,643 B1 | 12/2019 | Davis et al. |
| 10,558,823 B2 * | 2/2020 | Schroeder ............ G06N 20/20 |
| 11,222,138 B2 * | 1/2022 | Mohassel ............ A63B 21/222 |
| 11,296,861 B1 * | 4/2022 | Zhang .................. H04L 9/3033 |
| 11,443,237 B1 * | 9/2022 | Song .................... G06F 16/338 |
| 12,143,465 B2 * | 11/2024 | Nandakumar ........ G06F 21/602 |
| 12,160,504 B2 * | 12/2024 | Xu ........................ H04L 9/0819 |
| 12,206,758 B2 * | 1/2025 | Froelicher .............. G06F 7/544 |
| 2011/0110525 A1 * | 5/2011 | Gentry ...................... H04L 9/14 |
| | | 380/285 |
| 2015/0095132 A1 * | 4/2015 | Van Heerden ......... G06Q 40/06 |
| | | 705/14.32 |
| 2015/0095150 A1 * | 4/2015 | Globe .................... G06Q 40/06 |
| | | 705/36 R |
| 2016/0132968 A1 * | 5/2016 | Ayal ...................... G06Q 40/06 |
| | | 705/36 R |
| 2019/0068627 A1 * | 2/2019 | Thampy ............... H04L 63/1425 |
| 2019/0108353 A1 * | 4/2019 | Sadeh ................... H04L 67/306 |
| 2019/0260784 A1 | 8/2019 | Stockdale et al. |
| 2019/0332946 A1 * | 10/2019 | Han ...................... G06N 5/022 |
| 2019/0377885 A1 | 12/2019 | Schroeder et al. |
| 2020/0050773 A1 * | 2/2020 | Schroeder ............. G06N 20/00 |
| 2020/0090077 A1 * | 3/2020 | Yang ..................... G06Q 40/06 |
| 2020/0090268 A1 | 3/2020 | Yang et al. |
| 2020/0090269 A1 * | 3/2020 | Yang ..................... G06Q 40/06 |
| 2020/0126160 A1 * | 4/2020 | Roth ...................... G06Q 40/06 |
| 2020/0252198 A1 * | 8/2020 | Nandakumar ......... G06N 3/084 |
| 2021/0406717 A1 * | 12/2021 | Tauheed ................ G06N 20/10 |
| 2022/0255764 A1 * | 8/2022 | Li .......................... G06F 21/606 |
| 2023/0074417 A1 * | 3/2023 | Liu ........................ G06N 3/084 |
| 2023/0325529 A1 * | 10/2023 | Sav ....................... G06F 21/6245 |
| | | 726/26 |
| 2024/0015003 A1 * | 1/2024 | Prasad .................. G06N 20/00 |
| 2024/0037252 A1 * | 2/2024 | Zheng ................... G06F 21/604 |

* cited by examiner

405

Setting Modification Confirmation

Your preferences have been modified to send an automated password renewal reminder every 90 days. Would you like to accept this modification? If not, your settings will revert back.

Yes    No

Setting Modification Interface

Customers who reset their passwords on a regular basis are less likely to have a breach in their accounts. Would you like to modify your settings to send an automated password renewal reminder every 90 days?

Yes    No

Setting Modification Confirmation

Your settings have been updated. Thanks for being savvy about your privacy settings!

FIG. 6

SETTINGS OPTIMIZATION ENGINE USING ARTIFICIAL INTELLIGENCE TO ENHANCE CLIENT PRIVACY

CROSS-REFERENCE TO RELATED APPLICATION

This application is a continuation of U.S. Ser. No. 16/897,394 filed on Jun. 10, 2020, which application is incorporated by reference herein in its entirety.

BACKGROUND

Aspects of the disclosure relate to optimization of client settings. In particular, one or more aspects of the disclosure relate to computing platforms that implement machine learning algorithms and datasets to optimize user preferences and/or other settings to enhance privacy.

In some cases, an individual may establish a user account and may select one or more initial settings for the account. In some instances, however, such settings may be default settings and/or might not represent an optimal settings configuration for the individual. For example, the individual may be unaware of certain settings that are even available. In some instances, however, it may be difficult to efficiently identify an optimal settings configuration. For example, a substantial amount of data of a plurality of data types may provide insight as to an optimal settings configuration for an individual, but it may be difficult to process this data for output of a settings configuration.

SUMMARY

Aspects of the disclosure provide effective, efficient, scalable, and convenient technical solutions that address and overcome the technical problems associated with privacy setting optimization. For example, some aspects of the disclosure provide techniques that may enable computing devices to train a machine learning model using enterprise account data and third party source data, use the model to identify an optimal settings configuration, and, in some instances, automatically execute settings modifications in accordance with the optimal settings configuration. In doing so, various technical advantages may be realized. For example, one technical advantage is the incorporation of additional data sources into the settings optimization analysis. For instance, in addition to using account settings for other accounts of the same type, account settings and/or other non-setting data may be incorporated into the analysis. This may increase the accuracy of the analysis. Another technical advantage is the improvement of data processing capabilities by a settings optimization system. For example, by training a machine learning model to perform the analysis, a system implementing one or more aspects of the disclosure may efficiently process and incorporate a substantial amount of data of varied data types into the settings optimization analysis. Accordingly, these advantages may result in increased enterprise capabilities, such as providing recommendations and/or automatically modifying settings configurations to ensure privacy and security, while enabling user customization.

In accordance with one or more embodiments of the disclosure, a computing platform comprising at least one processor, a communication interface, and memory storing computer-readable instructions may monitor an enterprise data source to identify input of initial account settings for a first individual of a plurality of individuals. Using an identity of the first individual and a settings optimization model, the computing platform may identify enterprise account data and third party source data for the first individual, where the settings optimization model is trained by the computing platform using enterprise account data and third party source data for the plurality of individuals. By inputting the enterprise account data and the third party source data for the first individual into the settings optimization model, the computing platform may identify a subset of the plurality of individuals having common characteristics with the first individual. Using the settings optimization model, the computing platform may identify one or more discrepancies between the initial account settings for the first individual and account settings for the subset of the plurality of individuals, where the account settings for the subset of the plurality of individuals are included in the enterprise account data for the plurality of individuals. Based on the one or more discrepancies between the initial account settings for the first individual and the account settings for the subset of the plurality of individuals, the computing platform may identify one or more account settings modifications for the first individual. The computing platform may monitor an event processing system to detect an interaction by the first individual. Based on the detected interaction, the computing platform may compare account settings corresponding to the detected interaction to the one or more account settings modifications, where the comparison of the account settings corresponding to the detected interaction to the one or more account settings modifications results in a determination that a first modification of the one or more account settings modifications applies to the account settings corresponding to the detected interaction. The computing platform may send one or more commands directing an enterprise data source to modify the initial account settings based on the first modification, which may cause the enterprise data source to modify the initial account settings based on the first modification.

In one or more instances, the computing platform may send, to the enterprise data source, a request for the enterprise account data for the plurality of individuals. The computing platform may receive, from the enterprise data source, the enterprise account data for the plurality of individuals, where the enterprise account data includes privacy settings for online banking accounts for the plurality of individuals.

In one or more instances, the computing platform may send, to a third party data source, a request for the third party source data for the plurality of individuals. The computing platform may receive, from the third party data source, the third party source data for the plurality of individuals.

In one or more instances, the third party source data may include one or more of: social media privacy settings, device privacy settings, privacy settings for an application, or privacy settings for another website. In one or more instances, the initial account settings may include privacy settings for an online banking account.

In one or more instances, the one or more account settings modifications may include one or more of: password strength parameters, frequency of password changes, transaction limits, suspicious transaction identification, or attempted login notifications related to unknown devices. In one or more instances, the detected interaction may be an action of the first individual within an online banking account.

In one or more instances, based on the determination that the first modification of the one or more account settings modifications applies to the account settings corresponding to the detected interaction, the computing platform may compute a likelihood of acceptance score indicating a likelihood of acceptance of the first modification by the first individual. In one or more instances, the computing platform may compare the likelihood of acceptance score to a first predetermined threshold, and sending the one or more commands directing the enterprise data source to modify the initial account settings based on the first modification may be based on a determination that the likelihood of acceptance score exceeds the first predetermined threshold.

In one or more instances, the computing platform may monitor the event processing system to detect a second interaction by the first individual. Based on the second detected interaction, the computing platform may compare account settings corresponding to the second detected interaction to the one or more account settings modifications, where the comparison of the account settings corresponding to the second detected interaction to the one or more account settings modifications results in a determination that a second modification of the one or more account settings modifications applies to the account settings corresponding to the second detected interaction. Based on the determination that the second modification of the one or more account settings modifications applies to the account settings corresponding to the second detected interaction, the computing platform may compute a second likelihood of acceptance score indicating a likelihood of acceptance of the second modification by the first individual. The computing platform may determine that the second likelihood of acceptance score does not exceed the first predetermined threshold. Based on the determination that the second likelihood of acceptance score does not exceed the first predetermined threshold, the computing platform may compare the second likelihood of acceptance score to a second predetermined threshold. Based on a determination that the second predetermined threshold is exceeded, the computing platform may send one or more commands directing a user device corresponding to the first individual to display a prompt requesting permission to perform the second modification, which may cause the user device corresponding to the first individual to display the prompt requesting the permission to perform the second modification. Based on a determination that the second predetermined threshold is not exceeded, the computing platform may determine that the second modification should not be performed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for implementing machine learning to optimize client privacy settings in accordance with one or more example embodiments;

FIGS. 4-6 depict illustrative graphical user interfaces for implementing machine learning to optimize client privacy settings in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe an artificial intelligent (AI) privacy engine that may be developed and deployed to provide customers with recommended privacy settings (e.g., based on what other similar customers preferred with respect to their own privacy settings). The AI privacy engine may analyze different types of people, with different privacy comfort levels, and may categorize people based on different factors. The privacy engine may be offered within online banking (e.g., to suggest settings based on "what people like you" typically prefer). In some instances, this may be expanded beyond online banking so that the AI privacy engine may set privacy settings across multiple different applications (e.g., social media apps, other apps on customer devices, etc.). In some instances, the AI privacy engine may classify groups of similar applications to which similar privacy settings may be applied (e.g., some apps may be more invasive than others and may require tighter controls).

Accordingly, by performing one or more of the methods described herein, one or more of the systems described herein may dynamically recommend and/or automatically adjust settings for individuals to optimize their privacy controls. In doing so, account security may be enhanced and unauthorized access to accounts may be reduced.

Figure 1A:
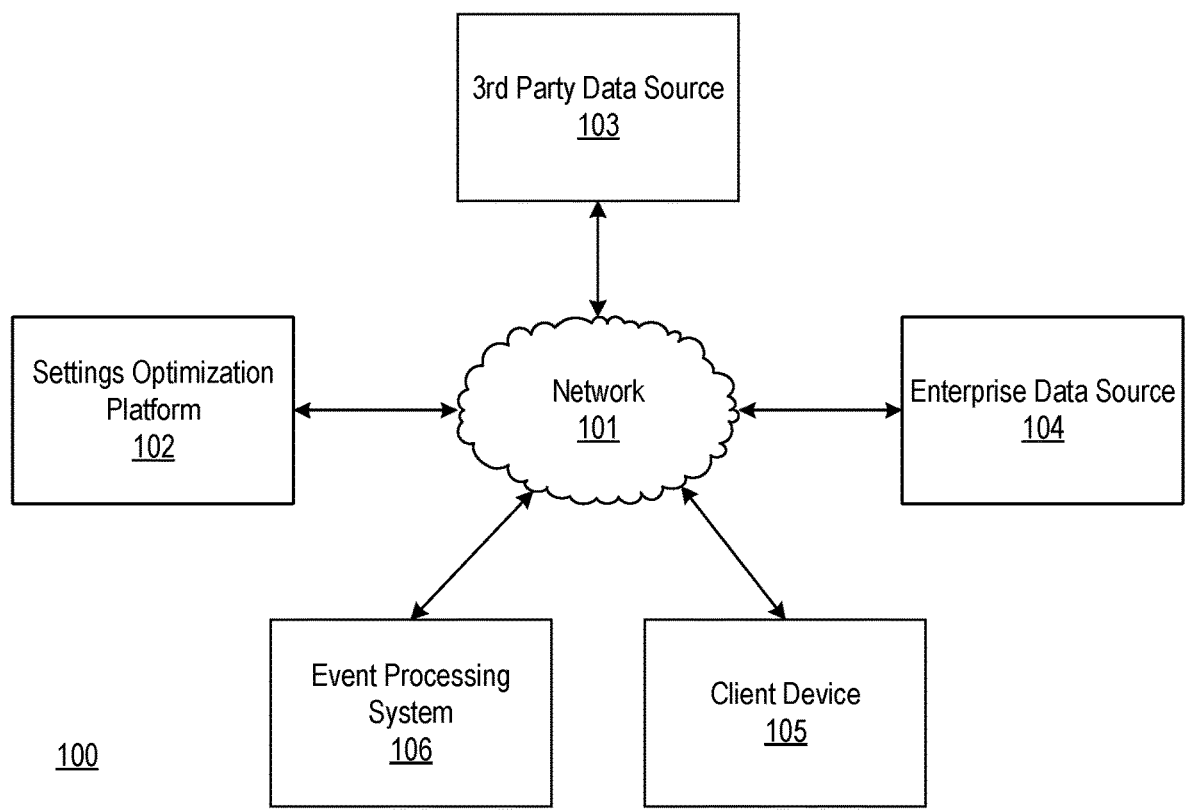
FIGS. 1A-1B depict an illustrative computing environment for implementing machine learning to optimize client privacy settings in accordance with one or more example embodiments.
Figure 1B:
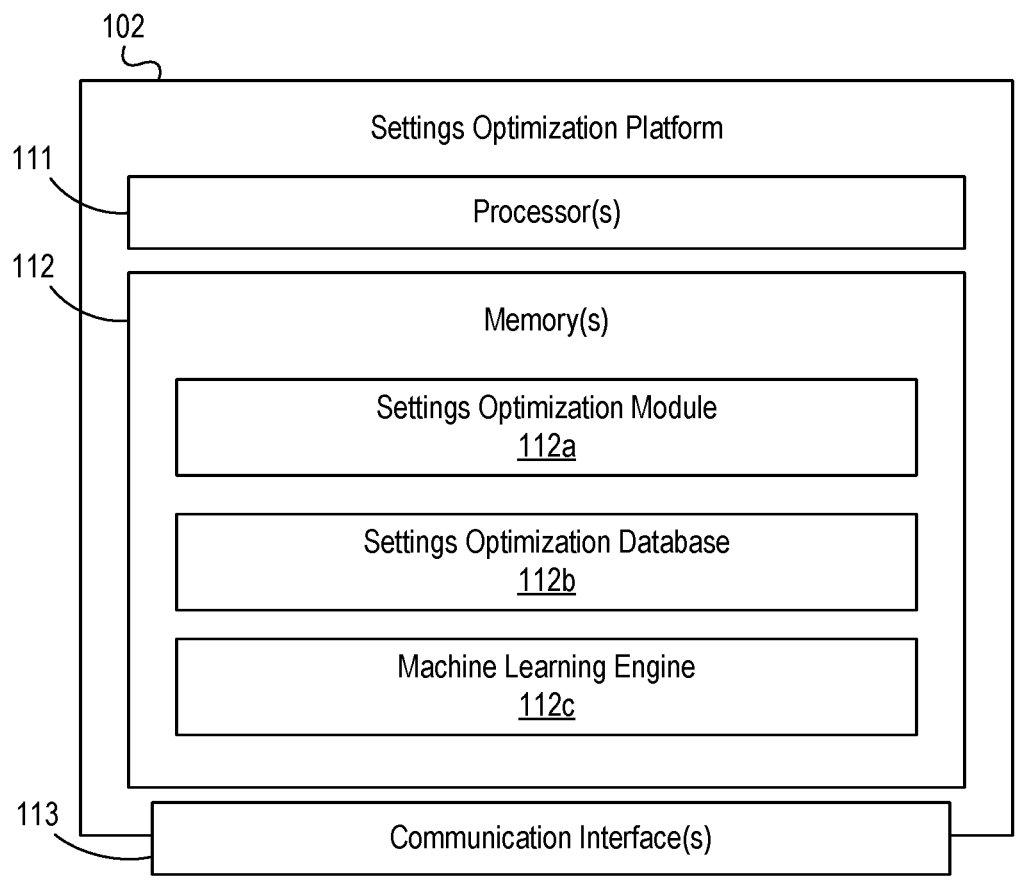

FIGS. 1A-1B depict an illustrative computing environment that implements machine learning to optimize client privacy settings in accordance with one or more example embodiments. Referring to FIG. 1A, computing environment 100 may include one or more computer systems. For example, computing environment 100 may include a settings optimization platform 102, third party data source 103, enterprise data source 104, client device 105, and event processing system 106.

As described further below, settings optimization platform 102 may be a computer system that includes one or more computing devices (e.g., servers, server blades, or the like) and/or other computer components (e.g., processors, memories, communication interfaces) that may be used to host and maintain a settings optimization model. In some instances, the settings optimization platform 102 may be configured to identity privacy settings of similarly situated individuals and recommend/perform one or more privacy settings modifications for a particular individual based on the identified privacy settings. In some instances, the settings optimization platform 102 may be configured to dynamically update the settings optimization model as additional data and/or feedback is received.

Third party data source 103 may be one or more computing devices such as servers, server blades, or the like that may be configured to store third party source data. For example, the third party data source 103 may be configured to store: social media privacy settings, credit card privacy settings, device privacy settings, privacy settings for an application, privacy settings for another website, legislation corresponding to privacy, or the like.

Enterprise data source 104 may be one or more computing devices such as servers, server blades, or the like that may be configured to store enterprise account data. For example, the enterprise data source 104 may be configured to store user account data, such as privacy settings, account values, account types, number of accounts, loan information, or the like.

Client device 105 may be a mobile device, tablet, smartphone, desktop computer, laptop computer, or the like that may be used by an individual such as a customer of an enterprise organization (e.g., a financial institution). For example, the client device 105 may be used to interact with an account for an enterprise organization (e.g., an online banking account, or the like). In some instances, client device 105 may be configured to display one or more user interfaces (e.g., online banking interfaces, or the like).

Event processing system 106 may be a server, server blade, or the like configured to perform one or more enterprise activities (e.g., online banking activities, financial transactions, trades, or the like). For example, event processing system 106 may be maintained by an enterprise organization, such as a financial institution.

Computing environment 100 also may include one or more networks, which may interconnect settings optimization platform 102, third party data source 103, enterprise data source 104, client device 105, event processing system 106, or the like. For example, computing environment 100 may include a network 101 (which may interconnect, e.g., settings optimization platform 102, third party data source 103, enterprise data source 104, client device 105, event processing system 106, or the like).

In one or more arrangements, settings optimization platform 102, third party data source 103, enterprise data source 104, client device 105, and/or event processing system 106 may be any type of computing device capable of sending and/or receiving requests and processing the requests accordingly. For example, settings optimization platform 102, third party data source 103, enterprise data source 104, client device 105, event processing system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of settings optimization platform 102, third party data source 103, enterprise data source 104, client device 105, and/or event processing system 106, may, in some instances, be special-purpose computing devices configured to perform specific functions.

Referring to FIG. 1B, settings optimization platform 102 may include one or more processors 111, memory 112, and communication interface 113. A data bus may interconnect processor 111, memory 112, and communication interface 113. Communication interface 113 may be a network interface configured to support communication between settings optimization platform 102 and one or more networks (e.g., network 101, or the like). Memory 112 may include one or more program modules having instructions that when executed by processor 111 cause settings optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of settings optimization platform 102 and/or by different computing devices that may form and/or otherwise make up settings optimization platform 102. For example, memory 112 may have, host, store, and/or include settings optimization module 112a, settings optimization database 112b, and a machine learning engine 112c.

Settings optimization module 112a may have instructions that direct and/or cause settings optimization platform 102 to execute advanced machine learning techniques to optimize privacy settings, as discussed in greater detail below. Settings optimization database 112b may store information used by settings optimization module 112a and/or settings optimization platform 102 in application of advanced machine learning techniques to optimize privacy settings, and/or in performing other functions. Machine learning engine 112c may have instructions that direct and/or cause the settings optimization platform 102 to set, define, and/or iteratively refine optimization rules and/or other parameters used by the settings optimization platform 102 and/or other systems in computing environment 100.

Figure 2A:
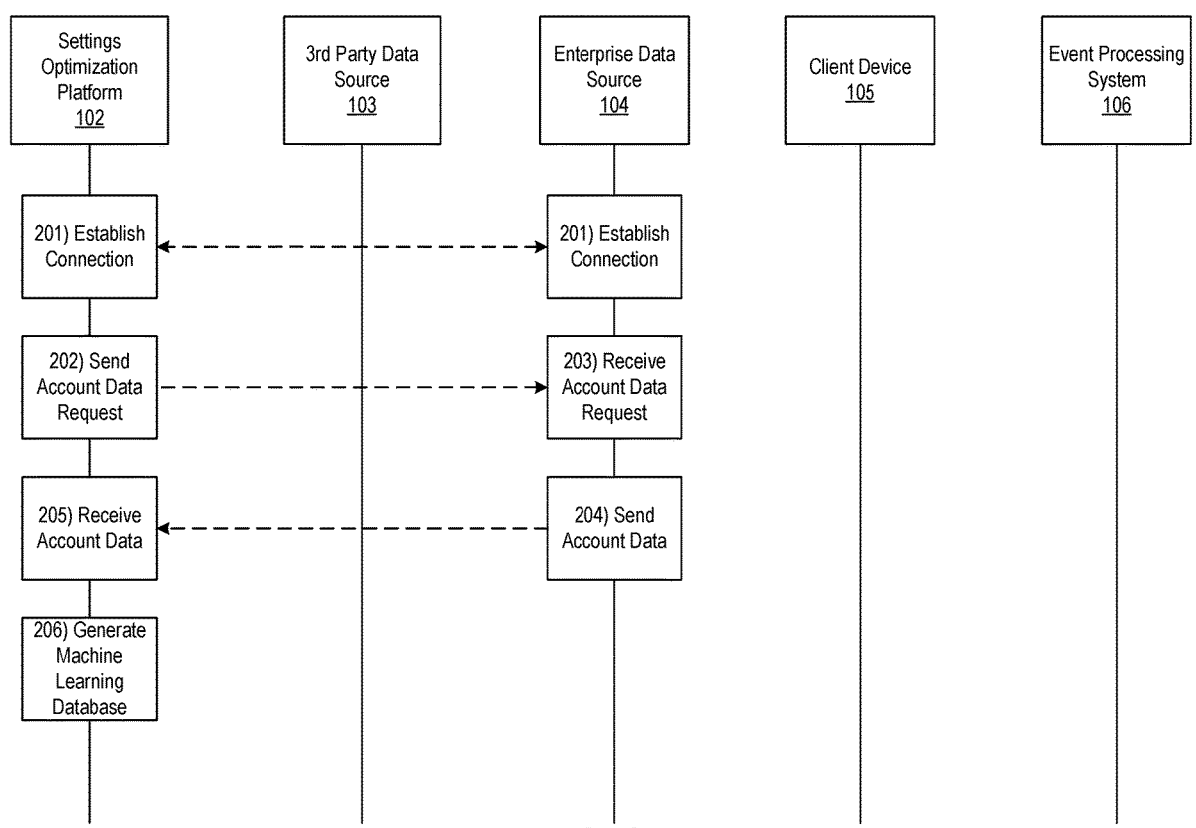

FIGS. 2A-2J depict an illustrative event sequence that implements machine learning to optimize client privacy settings in accordance with one or more example embodiments. Referring to FIG. 2A, at step 201, the settings optimization platform 102 may establish a connection with enterprise data source 104. For example, the settings optimization platform 102 may establish a first wireless data connection with enterprise data source 104 to link the settings optimization platform 102 to the enterprise data source 104 (e.g., in preparation for sending a request for enterprise account data). In some instances, the settings optimization platform 102 may identify whether a connection is already established with the enterprise data source 104. If a connection is already established with the enterprise data source 104, the settings optimization platform 102 might not re-establish the connection. If a connection is not yet established with the enterprise data source 104, the settings optimization platform 102 may establish the first wireless data connection as described herein.

At step 202, the settings optimization platform 102 may send a request for enterprise account data to the enterprise data source 104. For example, the settings optimization platform 102 may send the request for enterprise account data to the enterprise data source 104 via the communication interface 113 and while the first wireless data connection is established. For example, the settings optimization platform 102 may send a request for user account data, such as privacy settings, account values, account types, number of accounts, loan information, or the like for a plurality of individuals (e.g., customer of an enterprise organization such as a financial institution).

At step 203, the enterprise data source 104 may receive the request for enterprise account data from the settings optimization platform 102. For example, the enterprise data source 104 may receive the request for enterprise account data while the first wireless data connection is established.

At step 204, the enterprise data source 104 may send the enterprise account data to the settings optimization platform 102. In some instances, the enterprise data source 104 may send the enterprise account data to the settings optimization platform 102 while the first wireless data connection is established.

At step 205, the settings optimization platform 102 may receive the enterprise account data from the enterprise data source 104. For example, the settings optimization platform 102 may receive the enterprise account data via the communication interface 113 and while the first wireless data connection is established.

At step 206, the settings optimization platform 102 may generate a machine learning database (e.g., for a settings optimization model) using the enterprise account data received at step 205. For example, the settings optimization platform 102 may store correlations between user identifiers and their corresponding enterprise account data (e.g., their corresponding privacy settings, account values, account types, number of accounts, loan information, or the like).

Figure 2B:
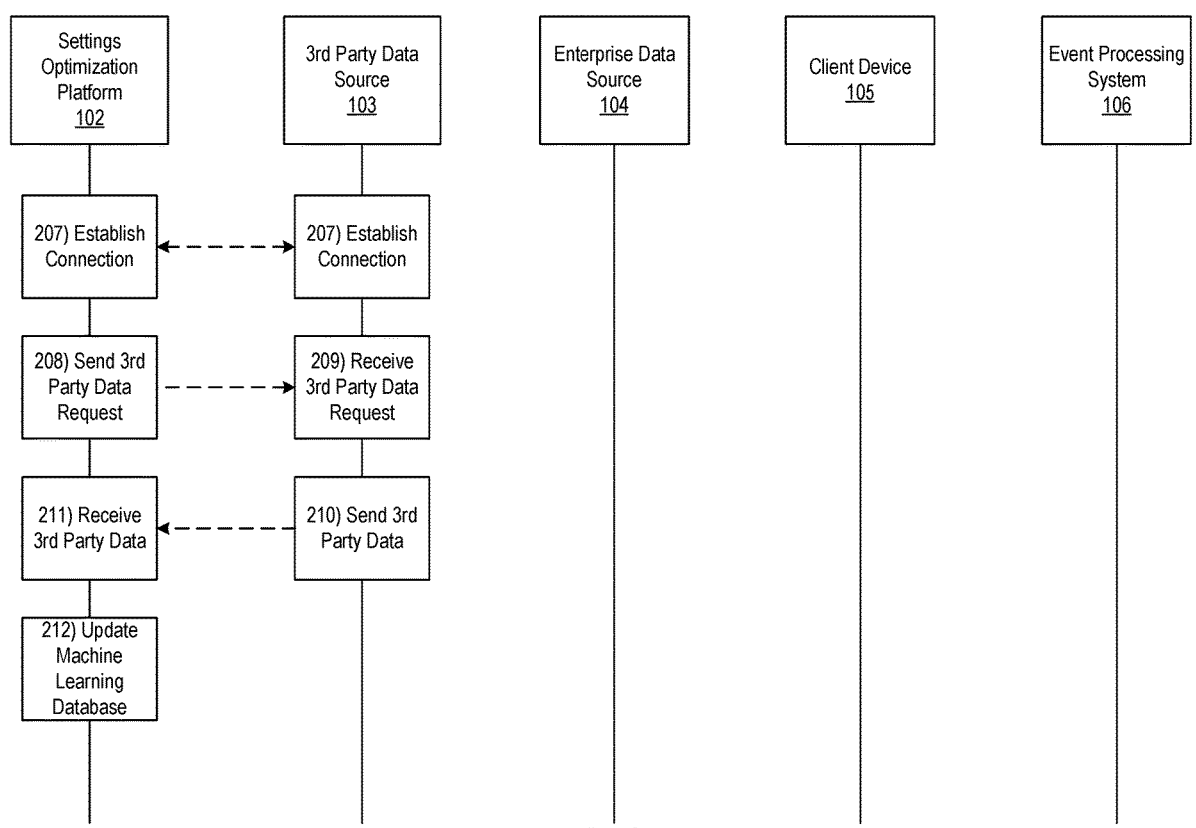

Referring to FIG. 2B, at step 207, the settings optimization platform 102 may establish a connection with third party data source 103. For example, the settings optimization platform 102 may establish a second wireless data connection with the third party data source 103 to link the settings optimization platform 102 to the third party data source 103 (e.g., in preparation for sending a request for third party source data). In some instances, the settings optimization platform 102 may identify whether or not a connection is already established with the third party data source 103. If a connection is already established with the third party data source 103, the settings optimization platform 102 might not re-establish the connection. If a connection is not yet established with the third party data source 103, the settings optimization platform 102 may establish the second wireless data connection as described herein.

At step 208, the settings optimization platform 102 may send a request for third party source data (e.g., social media privacy settings, credit card privacy settings, device privacy settings, privacy settings for an application, privacy settings for another website, legislation corresponding to privacy, or the like) to the third party data source 103. In some instances, the settings optimization platform 102 may send the request for third party source data to the third party data source 103 via the communication interface 113 and while the second wireless data connection is established.

At step 209, the third party data source 103 may receive the request for third party source data from the settings optimization platform 102. For example, the third party data source 103 may receive the request for third party source data while the second wireless data connection is established.

At step 210, the third party data source 103 may identify third party source data corresponding to the individuals for which enterprise account data was previously provided (e.g., the customers of the enterprise organization), and may send the third party source data to the settings optimization platform 102. For example, the settings optimization platform 102 may have previously provided user identifiers for the customers of the enterprise organization to the third party data source 103. In some instances, the third party data source 103 may send the third party source data to the settings optimization platform 102 while the second wireless data connection is established.

At step 211, the settings optimization platform 102 may receive the third party source data from the third party data source 103. For example, the settings optimization platform 102 may receive the third party source data via the communication interface 113 and while the second wireless data connection is established.

At step 212, the settings optimization platform 102 may update the machine learning database (e.g., the settings optimization model) generated at step 206 to include the third party source data. For example, the settings optimization platform 102 may establish profiles for the individuals for whom data has been received, and may include both third party source data and enterprise account data for the individuals in their respective profiles. In doing so, the settings optimization platform 102 may establish a holistic privacy representation for the individuals.

Figure 2C:
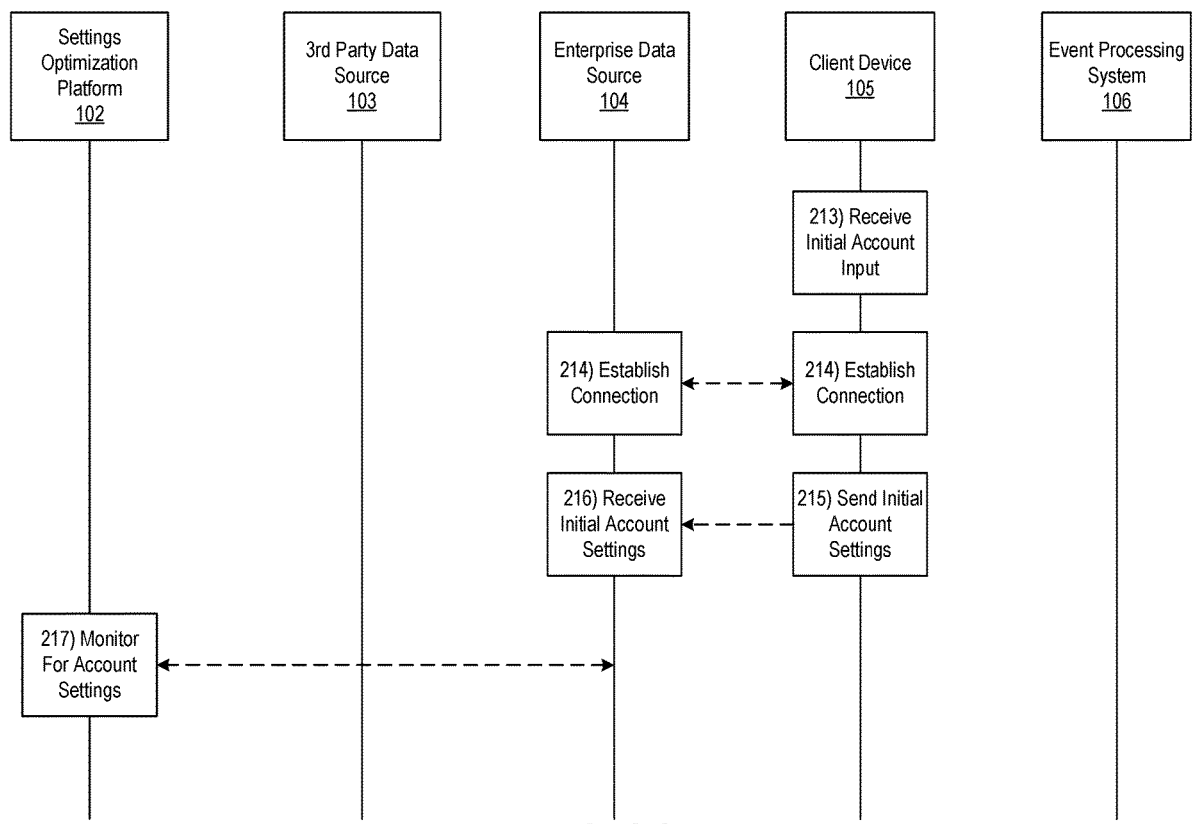

Referring to FIG. 2C, at step 213, the client device 105 may receive user input establishing an account and/or indicating initial settings for the account (e.g., an online banking account, or the like). In some instances, the client device 105 may receive the initial account input from an individual for whom enterprise account data and/or third party source data was previously stored by the settings optimization platform 102 (e.g., in establishing the settings optimization model). For example, the individual may be an existing customer of an enterprise organization, such as a financial institution, who is establishing a new account (e.g., already has a checking account and a savings account, but now opening an investment account, or the like). In other instances, the client device 105 may receive the initial account input from an individual who is a new customer. In these instances, third party source data may have been previously received by the settings optimization platform 102 for the individual, but enterprise account data might not have been received (or enterprise account data from another enterprise organization, such as a different financial institution, may have been received). In some instances, in receiving the initial account input, the client device 105 may receive initial account privacy settings related to an online banking account (e.g., password strength parameters, frequency of password changes, transaction limits, suspicious transaction identification, attempted login notifications related to unknown devices, or the like). In some instances, the client device 105 may receive the initial account input at a display of the client device 105.

At step 214, the client device 105 may establish a connection with the enterprise data source 104. For example, the client device 105 may establish a third wireless data connection to link the client device 105 to the enterprise data source 104 (e.g., in preparation for sending initial account settings information). In some instances, the client device 105 may identify whether or not a connection is already established with the enterprise data source 104. If a connection is already established, the client device 105 might not re-establish the connection. If a connection is not yet established, the client device 105 may establish the third wireless data connection as described herein.

At step 215, the client device 105 may send initial account setting information to the enterprise data source 104 (e.g., indicating the settings corresponding to the initial account input). In some instances, the client device 105 may send the initial account setting information to the enterprise data source 104 while the third wireless data connection is established.

At step 216, the enterprise data source 104 may receive the initial account setting information from the client device 105. For example, the enterprise data source 104 may receive the initial account setting information from the client device 105 while the third wireless data connection is established.

At step 217, the settings optimization platform 102 may monitor the enterprise data source 104 to identify whether initial account settings information has been received. Although shown at step 217, the settings optimization platform 102 may constantly monitor the enterprise data source 104 to identify whether initial account settings information has been received. For example, the settings optimization platform 102 may identify each instance that a new account is established (e.g., and that corresponding privacy settings are configured). In some instances, the settings optimization platform 102 may monitor the enterprise data source 104 while the first wireless data connection is established. Once the settings optimization platform 102 identifies initial account setting information (e.g., such as the initial account setting information received by the enterprise data source 104 at step 216), the settings optimization platform 102 may proceed to step 218.

Figure 2D:
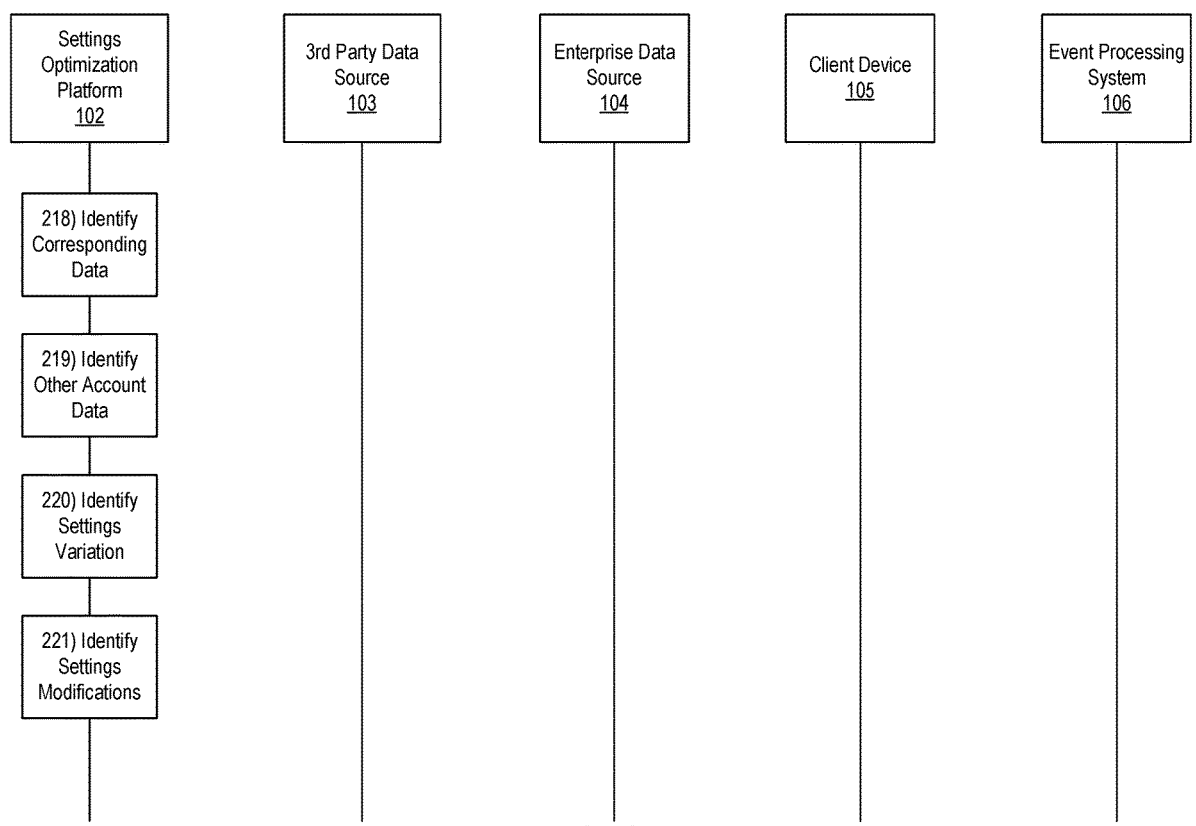

Referring to FIG. 2D, at step 218, the settings optimization platform 102 may identify enterprise account data and third party source data corresponding to an individual affiliated with the account for which the initial account settings were received (e.g., a user of client device 105, who may be referred to herein as the first individual). For example, the settings optimization platform 102 may index a user identifier for the first individual within the settings optimization model to identify other data corresponding to the first individual.

At step 219, the settings optimization platform 102 may feed the user identifier, the initial account settings, the corresponding third party source data (e.g., identified at step 218), the corresponding enterprise account data (e.g., identified at step 218, or the like, into the settings optimization model to identify similarly situated individuals. For example, the settings optimization platform 102 may identify correlations between data for the first individual and data (e.g., enterprise account data, third party source data, or the like) corresponding to other individuals that is stored in the settings optimization model. After identifying similarities between the data (e.g., a threshold number of matching privacy settings is exceeded, data within corresponding data ranges, or the like), the settings optimization platform 102 may identify individuals corresponding to the matching data (e.g., the similarly situated individuals). For example, the settings optimization platform 102 may identify other individuals who have similar privacy settings, account values, account types, number of accounts, loan information, social media privacy settings, credit card privacy settings, device privacy settings, privacy settings for an application, privacy settings for another website, age, or the like to the first individual so as to identify other users who may have similar preferences as the first individual (e.g., and thus may have configured an online banking account with privacy settings that may be desirable to the first individual).

At step 220, once the similarly situated individuals have been identified, the settings optimization platform 102 may compare the initial account settings for the first individual to the enterprise account data (which may, e.g., include account settings) for the similarly situated individuals. In some instances, the settings optimization platform 102 may identify that there is variation between the initial account settings for the first individual and the enterprise account data for the similarly situated individuals (e.g., there are discrepancies between their account privacy settings). In these instances, the settings optimization platform 102 may proceed to step 221. In instances where the settings optimization platform 102 does not identify variation, the settings optimization platform 102 might not proceed to step 221 with regard to the first individual.

At step 221, the settings optimization platform 102 may identify one or more settings modifications based on discrepancies identified at step 220. For example, the settings optimization platform 102 may identify that one or more settings modifications may be performed to eliminate the discrepancies between the initial account settings for the first individual and the enterprise account data for the similarly situated individuals (e.g., to bring the account privacy settings for the first individual in line with account privacy settings of other similarly situated individuals). In some instances, in identifying the one or more settings modifications, the settings optimization platform 102 may identify modifications to password strength parameters, frequency of password changes, transaction limits, suspicious transaction identification, attempted login notifications related to unknown devices, credit card storage preferences, biometric authentication settings, or the like.

In some instances, in addition to identifying the one or more settings modifications based on discrepancies between account settings for the first individual and similarly situated individuals, the settings optimization platform 102 may use the settings optimization model to identify the one or more settings modifications based on the enterprise account data and/or third party source data corresponding to the first individual. For example, the settings optimization platform 102 may receive third party source data corresponding to a government agency, such as the internal revenue service (IRS). In this example, the settings optimization platform 102 may identify that the first individual did not receive a direct deposit from the IRS, and may determine accordingly that the first individual is not signed up for direct deposit on his or her tax return. Accordingly, the settings optimization platform 102 may generate a settings modification recommending that the first individual sign up for direct deposit with the IRS. Additionally or alternatively, the settings optimization platform 102 may receive third party source data corresponding to updated privacy laws, regulations, or the like, and may identify privacy settings modifications that may result in improved privacy based on the new laws, regulations, or the like (e.g., the laws, regulations, or the like may offer increased potential for privacy enhancement).

Additionally or alternatively, the settings optimization platform 102 may use the settings optimization model to identify the one or more settings modifications based on the enterprise account data corresponding to the first individual. For example, the settings optimization platform 102 may receive enterprise account data for the first individual indicating that the first individual has an existing health savings account (HSA), investment account, or the like, and settings corresponding to the HSA and/or investment account (e.g., investment targets, amount invested, dollar amount, risk profile of how money is invested, or the like). By analyzing how money is invested in these other accounts, the settings optimization platform 102 may identify settings modifications to the initial account settings (which may e.g., be for a checking account). For example, the settings optimization platform 102 may assess a risk profile for the first individual based on his or her existing accounts, and may use the risk profile to identify the one or more settings modifications. In some instances, the settings optimization platform 102 may reconcile varied privacy settings from different accounts (e.g., the first individual may be more conservative with his or her savings account and less conservative with his or her investment account), and may identify settings modifications accordingly (e.g., the first individual will likely prefer settings similar to the savings account for a checking account rather than settings similar to the investment account).

Figure 2E:
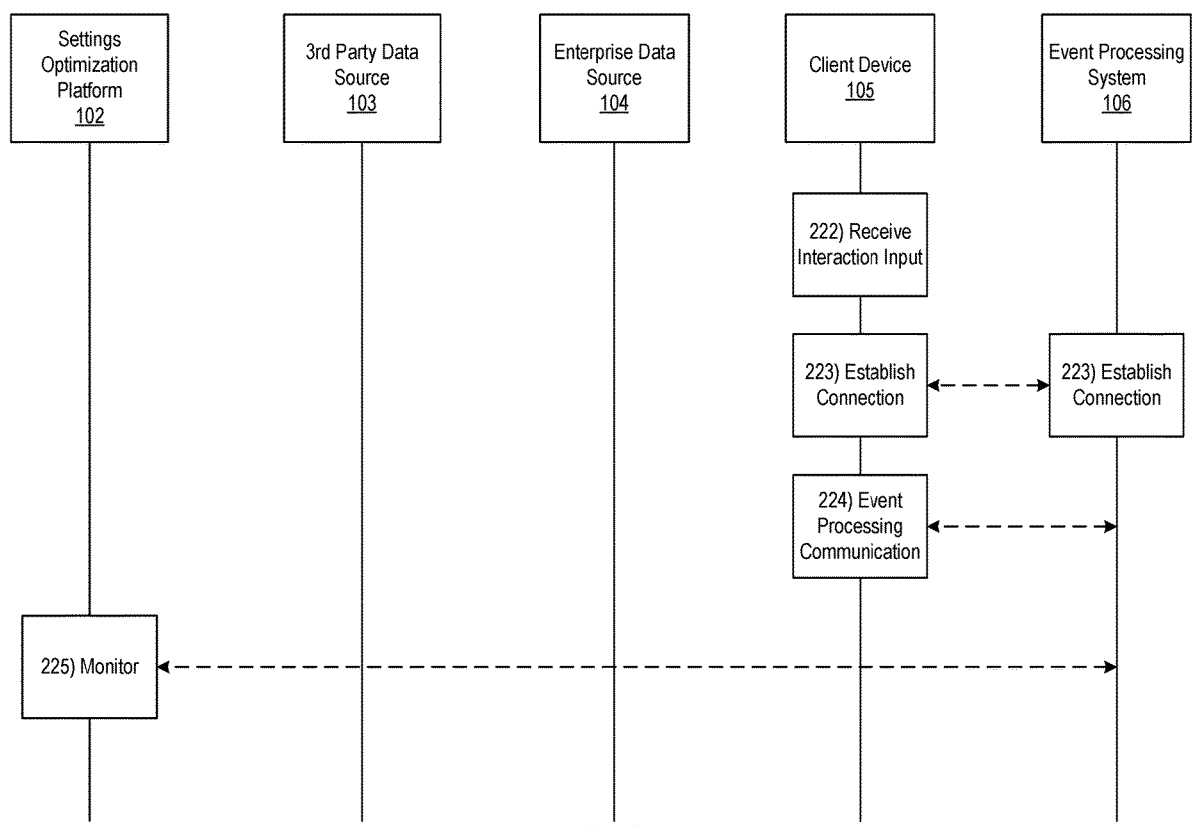

Referring to FIG. 2E, at step 222, the client device 105 may receive an interaction input (e.g., a user input corresponding to an interaction between the first individual and an account corresponding to the initial account settings). For example, the client device 105 may receive an interaction input corresponding to a request to transfer funds, view a statement, update profile settings, change a password, or the like within an online banking account.

At step 223, the client device 105 may establish a connection with the event processing system 106. For example, the client device 105 may establish a fourth wireless data connection with the event processing system 106 to link the client device 105 to the event processing system 106 (e.g., in preparation for sending communications related to event processing). In some instances, the client device 105 may identify whether or not a connection is already established with the event processing system 106. If a connection is already established with the event processing system 106, the client device 105 might not re-establish the connection. If a connection is not yet established with the event processing system, the client device 105 may establish the fourth wireless data connection as described herein.

At step 224, the client device 105 may communicate with the event processing system 106 to process an event requested by the interaction input (e.g., at step 222). In some instances, the client device 105 may communicate with the event processing system 106 while the fourth wireless data connection is established. For example, the client device 105 may communicate with the event processing system 106 to cause processing of a fund transfer, request to view a statement, request to update profile settings, request to change a password, or the like.

At step 225, the settings optimization platform 102 may monitor the event processing system 106 to identify interactions between the client device 105 and the event processing system 106 (e.g., such as the communication described at step 224). Although the settings optimization platform 102 is shown monitoring the event processing system 106 at step 225, this is for illustrative purposes only. For example, the settings optimization platform 102 may continually and dynamically monitor the event processing system 106 to identify interactions. In some instances, in identifying these interactions, the settings optimization platform 102 may identify one or more interactions related to changing account settings such as privacy settings, financial settings, user profile settings, or the like. In some instances, in identifying the interactions, the settings optimization platform 102 may trigger one or more automated actions as described below (e.g., with regard to steps 229 and 238).

Figure 2F:
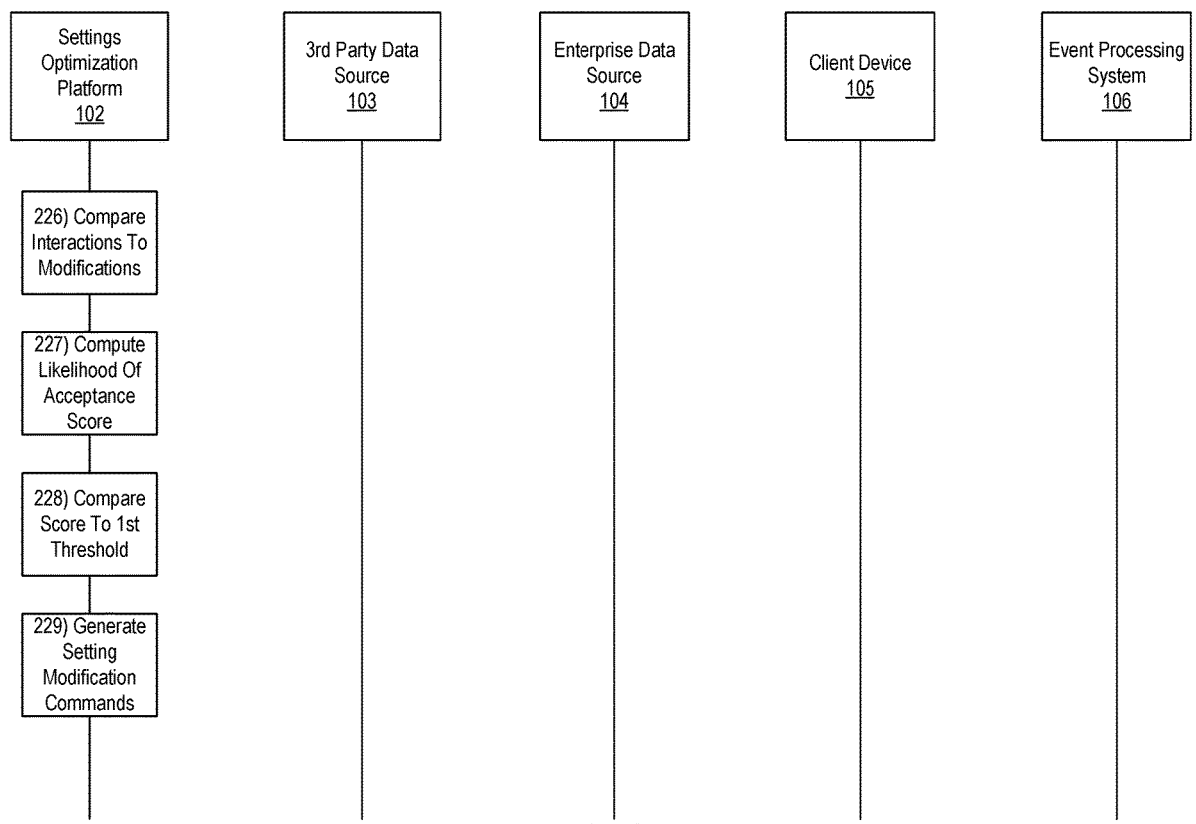

Referring to FIG. 2F, at step 226, based on identifying interactions at step 225, the settings optimization platform 102 may compare stored account settings corresponding to the identified interactions to identified account setting modifications. For example, the settings optimization platform 102 may use the settings optimization model to maintain a list of settings modifications related to particular account interactions (e.g., settings that in some way affect each interaction such that the modification is relevant to the interaction). For example, a setting indicating a maximum transfer limit may be relevant if a transfer request has been received, or the like. The settings optimization platform 102 may feed the interactions identified at step 225 into the settings optimization model to cause output of a list of relevant modifications (e.g., modifications that related to the interaction). After outputting this list of relevant modifications, the settings optimization platform 102 may identify whether any of the settings modifications identified at step 221 match the list of relevant modifications. In doing so, the settings optimization platform 102 may enable itself to propose modifications that are relevant to particular actions (e.g., rather than proposing a plurality of random and/or unrelated modifications at an arbitrary time). In some instances, this may increase a likelihood of acceptance of the proposed modifications (e.g., because the first individual may be more likely to see a value, importance, effect, or the like of enacting the proposed modification). In some instances, the settings optimization platform 102 may identify one or more matches between the list of relevant modifications and the identified settings modifications, and may proceed to step 227. In other instances, the settings optimization platform 102 might not identify a match between the list of relevant modifications and the identified settings modifications, and may wait until a match is identified before proceeding to step 227. In some instances, the comparison described at step 226 may be triggered by the monitoring of the event processing system 106 described at step 225 above.

At step 227, the settings optimization platform 102 may compute a likelihood of acceptance score for the one or more identified settings modifications for which a match was identified at step 228. For example, the settings optimization platform 102 may use the settings optimization model to identify a likelihood that the one or more identified settings modifications will be accepted by the first individual based on historical acceptance data corresponding to the similarly situated individuals. In some instances, in computing the likelihood of acceptance score, the settings optimization platform 102 may compute a numeric value between 0 and 100, with 0 being the least likely to be accepted and 100 being the most likely to be accepted. In some instances, the settings optimization platform 102 may compute the likelihood of acceptance score based on identifying one or more matches between the list of relevant modifications and the identified settings modifications At step 228, the settings optimization platform 102 may compare the likelihood of acceptance score computed at step 226 to a first predetermined acceptance threshold. In some instances, the settings optimization platform 102 may dynamically set and/or adjust the first predetermined acceptance threshold based on one or more preconfigured settings. For example, the settings optimization platform 102 may dynamically adjust the first predetermined acceptance threshold to maintain a constant percentage of scores that exceed (e.g., 25%) and/or do not exceed (e.g., 75%) the first predetermined acceptance threshold. In some instances, the settings optimization platform 102 may determine that the likelihood of acceptance score exceeds the first predetermined acceptance threshold. In these instances, the settings optimization platform 102 may proceed to step 229. In other instances, the settings optimization platform 102 may determine that the likelihood of acceptance score does not exceed the first predetermined acceptance threshold. In these instances, the settings optimization platform 102 may proceed to step 236.

At step 229, the settings optimization platform 102 may generate one or more setting modification commands directing the enterprise data source 104 to modify the initial account settings based on the one or more identified settings modifications. For example, the one or more identified settings modifications may include implementing an automated password renewal reminder to be display to the first individual. In this example, the settings optimization platform 102 may automatically (e.g., without receiving further user or manual input) direct the enterprise data source 104 to set an automated password renewal reminder (e.g., the first individual might not previously have been receiving the reminder).

Figure 2G:
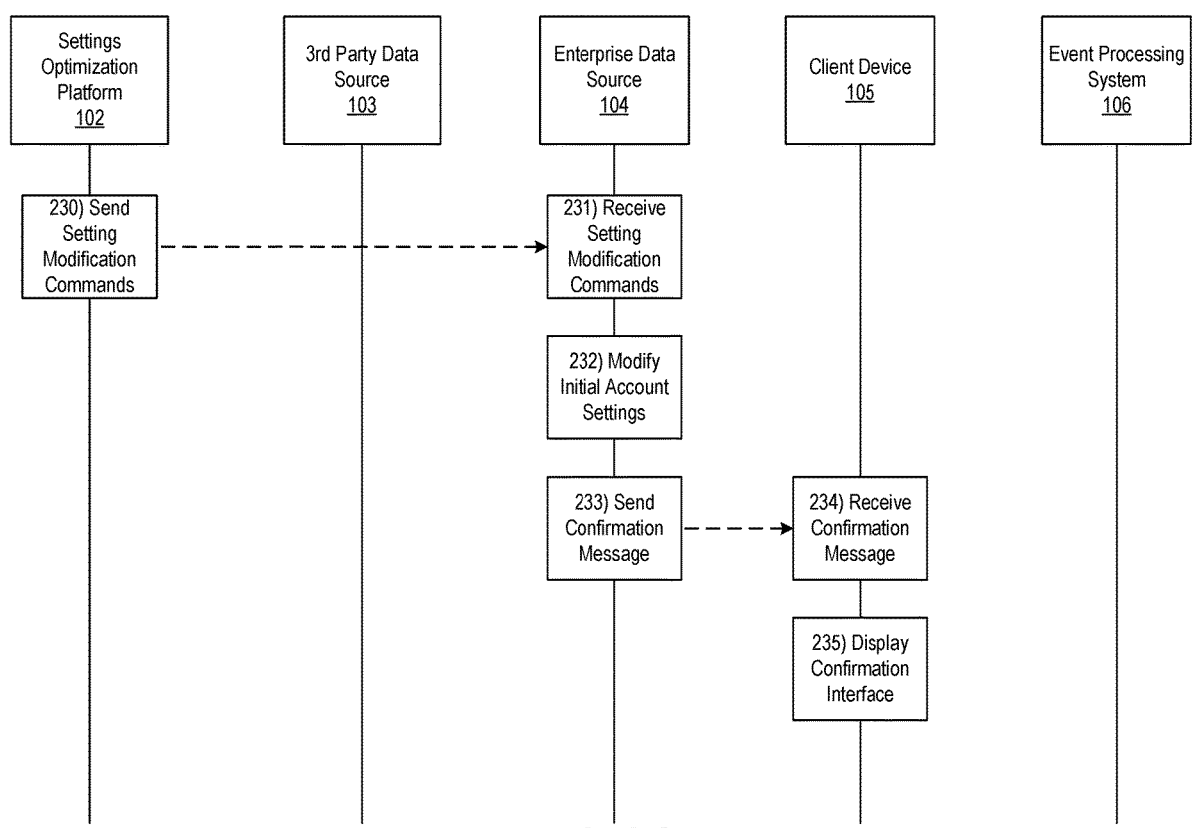

Referring to FIG. 2G, at step 230, the settings optimization platform 102 may send the one or more setting modification commands directing the enterprise data source to modify the initial account settings based on the one or more identified settings modifications to the enterprise data source 104. In some instances, the settings optimization platform 102 may send the one or more setting modification commands directing the enterprise data source to modify the initial account settings based on the one or more identified settings modifications to the enterprise data source 104 via the communication interface 113 and while the first wireless data connection is established. In some instances, sending the one or more setting modification commands directing the enterprise data source to modify the initial account settings based on the one or more identified settings modifications to the enterprise data source 104 may cause the enterprise data source 104 to modify the initial account settings to eliminate the discrepancy (e.g., as described at step 232). In some instances, the settings optimization platform 102 may send the one or more setting modification commands directing the enterprise data source to modify the initial account settings based on the one or more identified settings modifications to the enterprise data source 104.

In some instances, the settings optimization platform 102 may similarly direct modifications for other accounts (e.g., social media accounts, investment accounts, mobile application accounts, or the like) based on the modifications to the initial account settings. For example, the settings optimization platform 102 may cause an update of password strength parameters for the initial account settings for an online banking account, and may thus identify other accounts for the first individual, examine the password strength parameters for these accounts, and cause updates where necessary.

At step 231, the enterprise data source 104 may receive the one or more setting modification commands directing the enterprise data source to modify the initial account settings based on the one or more identified settings modifications. In some instances, the enterprise data source 104 may receive the one or more setting modification commands directing the enterprise data source to modify the initial account settings based on the one or more identified settings modifications while the first wireless data connection is established.

At step 232, the enterprise data source 104 may modify the initial account settings based on or in response to the one or more setting modification commands directing the enterprise data source to modify the initial account settings based on the one or more identified settings modifications. In doing so, the enterprise data source 104 may align the privacy settings of the first individual with privacy settings of one or more similarly situated individuals.

At step 233, the enterprise data source 104 may generate and send a setting modification confirmation message to the client device 105. In some instances, the enterprise data source 104 may send the setting modification confirmation message to the client device 105 while the third wireless data connection is established.

At step 234, the client device 105 may receive the setting modification confirmation message sent at step 233. In some instances, the client device 105 may receive the setting modification confirmation message from the client device 105 while the third wireless data connection is established.

At step 235, the client device 105 may display a confirmation interface based on the setting modification confirmation message received at step 234. For example, the client device 105 may display a graphical user interface similar to graphical user interface 405, which is shown in FIG. 4. For example, the client device 105 may display an interface indicating that privacy settings have been automatically modified, but offering the first individual the option to revert to the initial account settings. In some instances, after display of the confirmation interface, the event sequence may be complete.

Figure 2H:
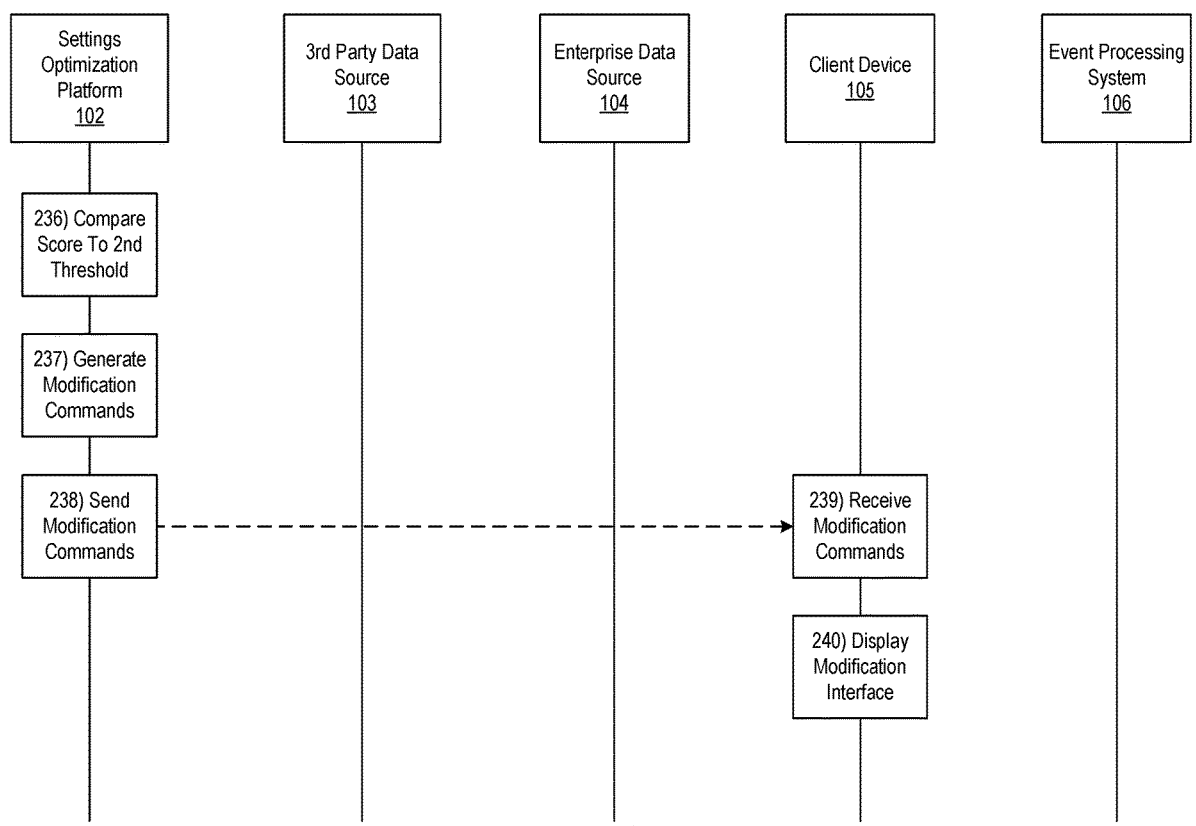
Figure 21:
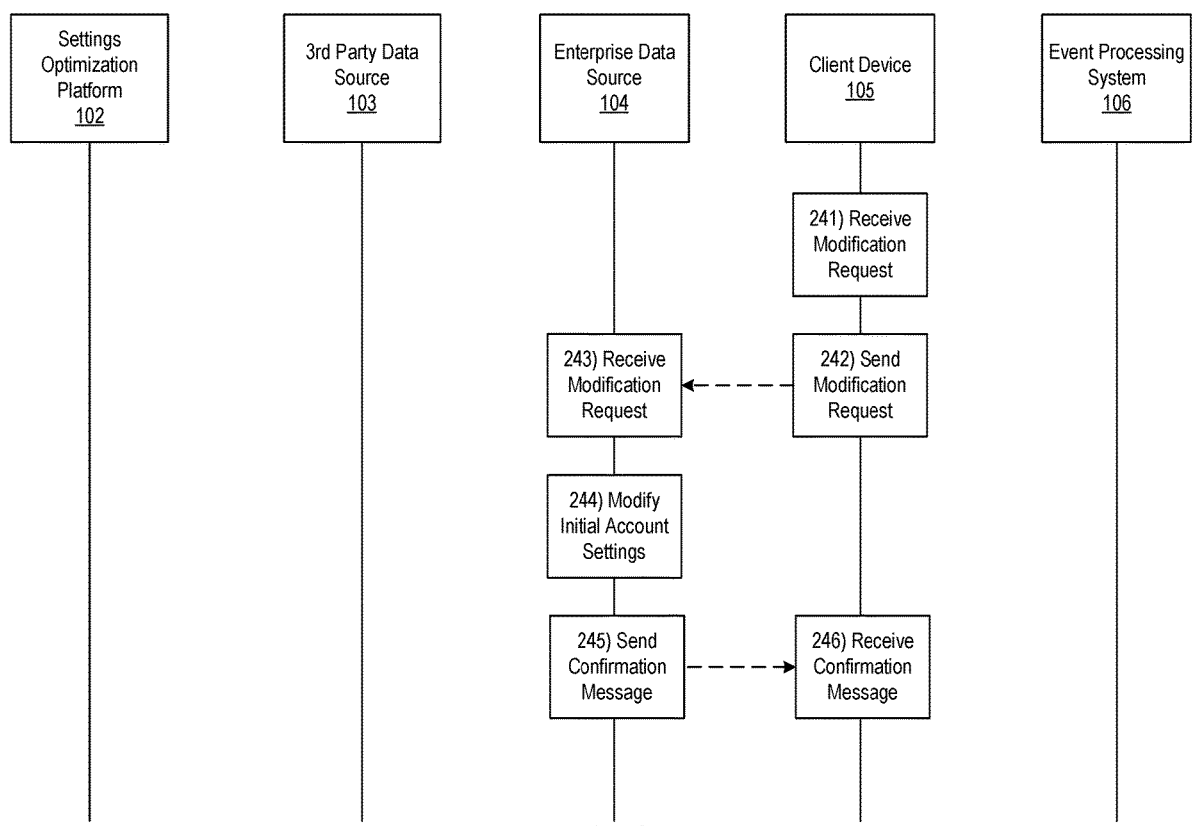

Referring to FIG. 2H, at step 236, settings optimization platform 102 may compare the likelihood of acceptance score, computed at step 227, to a second predetermined acceptance threshold (which may, e.g., be lower than the first predetermined threshold). In some instances, the settings optimization platform 102 may dynamically set and/or adjust the second predetermined acceptance threshold based on one or more preconfigured settings. For example, the settings optimization platform 102 may dynamically adjust the second predetermined acceptance threshold to maintain a constant percentage of scores that exceed (e.g., 50%) and/or do not exceed (e.g., 50%) the second predetermined acceptance threshold. In some instances, the settings optimization platform 102 may determine that the likelihood of acceptance score exceeds the second predetermined acceptance threshold. In these instances, the settings optimization platform 102 may proceed to step 237. In other instances, the settings optimization platform 102 may determine that the likelihood of acceptance score does not exceed the first predetermined acceptance threshold. In these instances, the event sequence may end (e.g., because it may be unlikely that the first individual may accept the identified settings modification).

At step 237, based on or in response to the determination that the likelihood of acceptance score exceeds the second predetermined acceptance threshold but does not exceed the first predetermined acceptance threshold, the settings optimization platform 102 may generate one or more commands directing the client device 105 to display a settings modification interface. In some instances, the settings optimization platform 102 may generate the settings modification interface. In other instances, the settings optimization platform 102 may generate settings modification interface information that may be used to generate the settings modification interface.

At step 238, the settings optimization platform 102 may send the one or more commands directing the client device 105 to display the settings modification interface via the communication interface 113 and while a wireless data connection (e.g., a fifth wireless data connection, which may e.g., be established similar to the first, second, third, and/or fourth wireless data connections as described above) is established. In some instances, the settings optimization platform 102 may also receive the settings modification interface and/or settings modification interface information to the client device 105.

At step 239, the client device 105 may receive the one or more commands directing the client device 105 to display the settings modification interface while the fifth wireless data connection is established. In some instances, the client device 105 may also receive the settings modification interface and/or settings modification interface information.

At step 240, the client device 105 may display the settings modification interface (e.g., as received from the settings optimization platform 102 or as generated using the settings modification interface information). In some instances, in displaying the settings modification interface, the client device 105 may display a graphical user interface similar to graphical user interface 505, which is shown in FIG. 5. For example, the client device 105 may display a graphical user interface indicating the identified settings modification, and requesting approval from the first individual before performing the modification (e.g., in contrast to graphical user interface 405, which indicates that the modification was already automatically performed). In some instances, in displaying the settings modification interface, the client device 105 may display a chatbot interface that may allow the first individual to interact with an automated chat system to perform a settings modification, which may, in some instances, be a conversational interface.

In some instances, the client device 105 may display a prompt to make modifications for other accounts (e.g., social media accounts, investment accounts, mobile application accounts, or the like) based on the modifications to the initial account settings. For example, client device 105 may display an interface indicating an update of password strength parameters for the initial account settings for an online banking account. In this example, the settings optimization platform 102 may have identified other accounts for the first individual, examined the password strength parameters for these accounts, and directed the client device 105 to similarly display an interface that includes options to update password strength parameters for these accounts as well.

Referring to FIG. 2I, at step 241, the client device 105 may receive user input requesting that the identified settings modification be performed. In these instances, the client device 105 may proceed to step 242. If the client device 105 receives a user input indicating that the identified settings modification should not be performed, the event sequence may end.

At step 242, the client device 105 may send a modification request to the enterprise data source 104. In some instances, the client device 105 may send the modification request to the enterprise data source 104 while the third wireless data connection is established.

At step 243, the client device 105 may receive the modification request, sent at step 242. For example, the client device 105 may receive the modification request while the third wireless data connection is established.

At step 244, the enterprise data source 104 may modify the initial account settings based on the identified settings modification. For example, actions described at step 244 may be similar to those described above at step 232.

At step 245, the enterprise data source 104 may send a modification confirmation message to the client device 105. In some instances, the enterprise data source 104 may send the modification confirmation message to the enterprise data source 104 while the third wireless data connection is established.

At step 246, the client device 105 may receive the modification confirmation message sent at step 245. In some instances, the client device 105 may receive the modification confirmation message while the third wireless data connection is established.

Figure 2J:
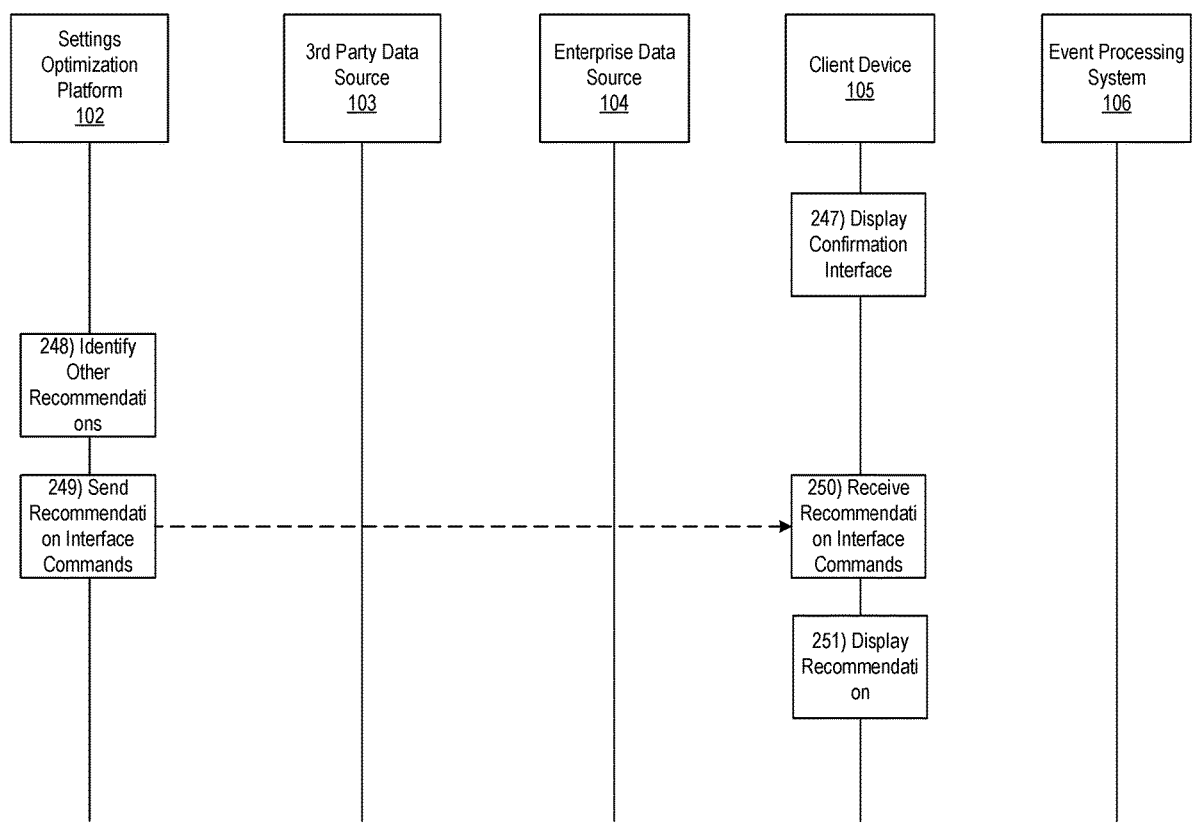

Referring to FIG. 2J, at step 247, the client device 105 may display a modification confirmation interface based on the modification message received at step 246. For example, the client device 105 may display a graphical user interface similar to graphical user interface 605, which is shown in FIG. 6 (which may, e.g., confirm that settings have been updated).

At step 248, the settings optimization platform 102 may identify one or more additional recommendations. For example, in addition to using the settings optimization model to identify potential privacy settings modifications, the settings optimization platform 102 may use similar techniques as those described above with regard to the settings optimization model to identify investment recommendations, job opportunities, financial planning recommendations, advertisements, or the like. For example, the settings optimization platform 102 may identify a risk tolerance, interests, skills, or the like for the first individual and may make additional recommendations accordingly. As a specific example, the settings optimization platform 102 may identify that the first individual has applied maximum privacy settings to his or her account, and may determine that the first individual may be risk averse accordingly. In this example, the settings optimization platform 102 may make investment recommendations to the first individual such as stable mutual funds, shift money from investments to a checking account, or the like. In contrast, if the settings optimization platform 102 identified that the first individual applied minimum privacy settings, it may make riskier investment recommendations to the first individual such as individual stocks in a particular company, or the like. As another example, if the settings optimization platform 102 performs a settings modification for a particular account as described above (e.g., an online banking account), the settings optimization platform 102 may make recommendations to make similar modifications in other accounts (e.g., social media accounts, investment accounts, mobile application accounts, or the like).

At step 249, the settings optimization platform 102 may one or more commands directing the client device 105 to display the one or more recommendations identified at step 248. In some instances, the settings optimizations platform 102 may send the one or more commands directing the client device 105 to display the one or more recommendations via the communication interface 113 and while the fifth wireless data connection is established.

At step 250, the client device 105 may receive the one or more commands directing the client device 105 to display the one or more recommendations. In some instances, the client device 105 may receive the one or more commands directing the client device 105 to display the one or more recommendations while the fifth wireless data connection is established.

At step 251, the client device 105 may display a recommendation interface based on or in response to the one or more commands directing the client device 105 to display the one or more recommendations. For example, the client device 105 may display the one or more recommendations and links to accept or deny the recommendations accordingly.

Figure 3:
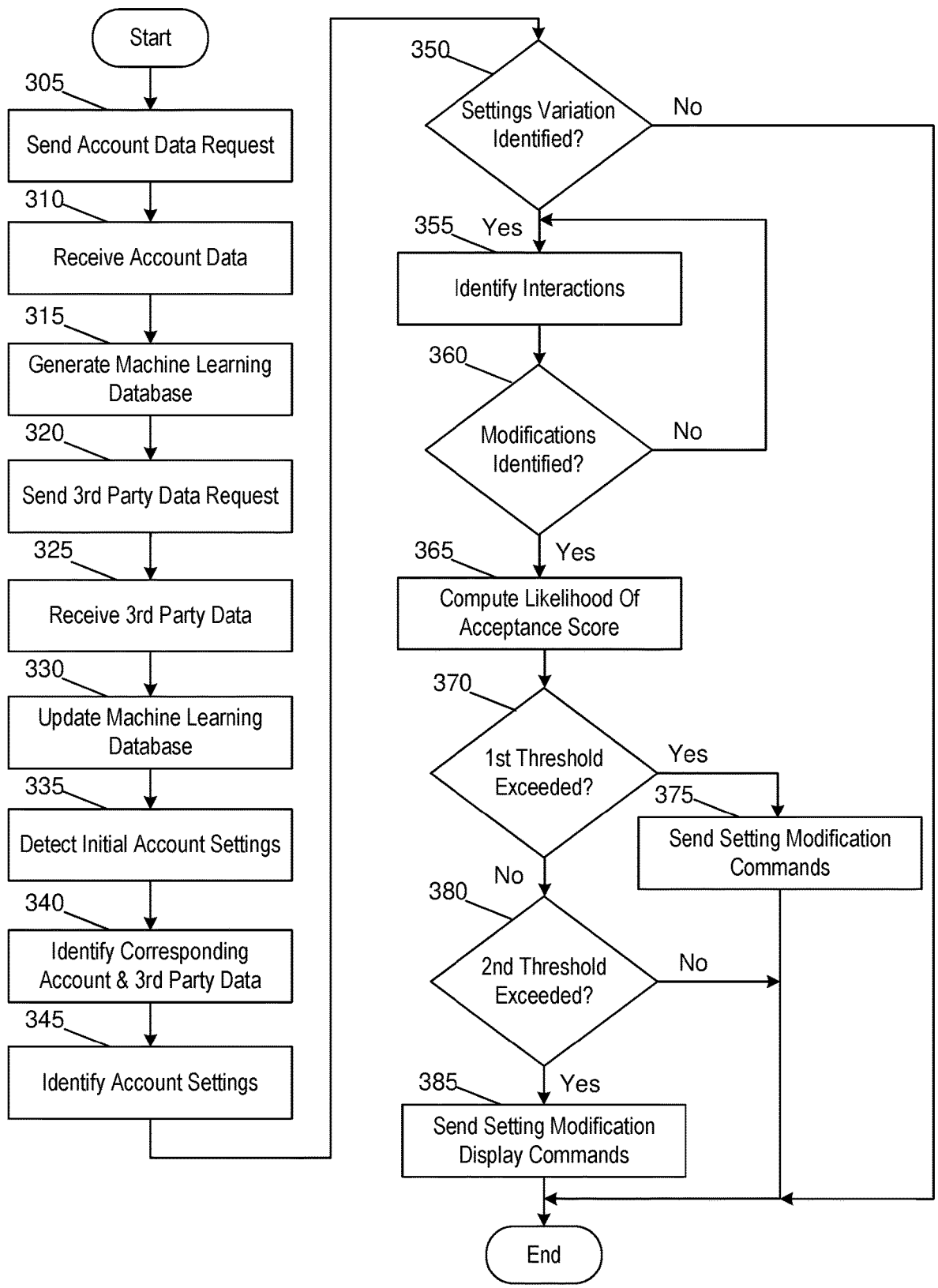
FIG. 3 depicts an illustrative method for implementing machine learning to optimize client privacy settings in accordance with one or more example embodiments.

FIG. 3 depicts an illustrative method for implementing machine learning to optimize client privacy settings in accordance with one or more example embodiments. Referring to FIG. 3, at step 305, a computing platform having at least one processor, a communication interface, and memory may send a request for enterprise account data to an enterprise data source. At step 310, the computing platform may receive the enterprise account data from the enterprise data source. At step 315, the computing platform may generate a machine learning database based on the enterprise account data. At step 320, the computing platform may send a request to a third party data source for third party source data. At step 325, the computing platform may receive the third party source data. At step 330, the computing platform may update the machine learning database using the third party source data. At step 335, the computing platform may detect initial account settings for an individual. At step 340, the computing platform may identify corresponding enterprise account data and third party source data corresponding to the individual. At step 345, the computing platform may use the machine learning database to identify similarly situated individuals to the individual based on the enterprise account data and the third party source data corresponding to the individual. At step 350, the computing platform may identify whether or not there is variation between the settings for the individual and the similarly situated individuals. If there is settings variation, the computing platform may proceed to step 355. If there is not settings variation, the method may end.

At step 355, the computing platform may identify interactions between the individual and an event processing system. At step 360, the computing platform may determine if any of the variation corresponds to the interactions, resulting in a determination that a modification should be made. If a modification should not be made, the computing platform may return to step 355. If a modification should be made, the computing platform may proceed to step 365.

At step 365, the computing platform may compute a likelihood of acceptance score. At step 370, the computing platform may compare the likelihood of acceptance score to a first predetermined acceptance threshold. If the first predetermined acceptance threshold is exceeded, the computing platform may proceed to step 375. At step 375, the computing platform may send one or more commands directing an enterprise data source to perform the settings modification.

Returning to step 370, if the first predetermined acceptance threshold is not exceeded, the computing platform may proceed to step 380. At step 380, the computing platform may determine whether the second predetermined acceptance threshold is exceeded. If the second predetermined acceptance threshold is not exceeded, the method may end. If the second predetermined acceptance threshold is exceeded, the computing platform may proceed to step 385. At step 385, the computing platform may send one or more commands directing the user device to display a settings modification interface.

In some instances, the systems, event sequence, and/or methods described above might not be limited to online banking accounts, and may in some instances relate to use cases involving other accounts such as investment accounts, social media accounts, electronic messaging accounts, or any other electronic accounts. Similarly, the systems, event sequence, and/or methods described above might not be limited to privacy settings, and may apply to other types of settings such as display settings, audio settings, preferences, or the like. Furthermore, although modifications to initial account settings are primarily described, the systems, event sequences and/or methods describe above are not limited to this example, and may, in some instances, apply to account settings that have already been modified one or more times (e.g., an initial setting may be modified, and the modified setting may be subsequently modified using one or more of the methods described herein).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
identify, by inputting enterprise account data and third party source data for a first individual into a settings optimization model, a subset of a plurality of individuals having common characteristics with the first individual;
identify, using the settings optimization model, one or more discrepancies between initial account settings for the first individual and account settings for the subset of the plurality of individuals, wherein the account settings for the subset of the plurality of individuals are included in the enterprise account data for the plurality of individuals, wherein the setting optimization model is further configured to identify investment recommendations, based on an identified risk tolerance for the first individual, and wherein identifying the investment recommendations comprises:
identifying that the first individual has applied maximum privacy settings to an account,
identifying, based on the maximum privacy settings, that the first individual is risk averse, and
generating a recommendation to shift from a higher risk investment to a lower risk investment;
identify, based on the one or more discrepancies between the initial account settings for the first individual and the account settings for the subset of the plurality of individuals, one or more account settings modifications for the first individual;
monitor an event processing system to detect an interaction by the first individual;
based on the detected interaction, compare account settings corresponding to the detected interaction to the one or more account settings modifications, wherein the comparison of the account settings corresponding to the detected interaction to the one or more account settings modifications results in a determination that a first modification of the one or more account settings modifications applies to the account settings corresponding to the detected interaction; and
send one or more commands directing an enterprise data source to modify the initial account settings based on the first modification, wherein sending the one or more commands directing the enterprise data source to modify the initial account settings based on the first modification causes the enterprise data source to modify the initial account settings based on the first modification.

2. The computing platform of claim 1, wherein the memory stores additional computer-readable instructions that, when executed by the at least one processor, further cause the computing platform to:
send, to the enterprise data source, a request for the enterprise account data for the plurality of individuals; and
receive, from the enterprise data source, the enterprise account data for the plurality of individuals, wherein the enterprise account data comprises privacy settings for online banking accounts for the plurality of individuals.

3. The computing platform of claim 2, wherein the memory stores additional computer-readable instructions that, when executed by the at least one processor, further cause the computing platform to:
send, to a third party data source, a request for the third party source data for the plurality of individuals; and
receive, from the third party data source, the third party source data for the plurality of individuals.

4. The computing platform of claim 3, wherein the third party source data comprises one or more of: social media privacy settings, device privacy settings, privacy settings for an application, or privacy settings for another website.

5. The computing platform of claim 1, wherein the initial account settings comprise privacy settings for an online banking account.

6. The computing platform of claim 1, wherein the one or more account settings modifications comprise one or more of: password strength parameters, frequency of password changes, transaction limits, suspicious transaction identification, or attempted login notifications related to unknown devices.

7. The computing platform of claim 1, wherein the detected interaction comprises an action of the first individual within an online banking account.

8. The computing platform of claim 1, wherein the memory stores additional computer-readable instructions that, when executed by the at least one processor, further cause the computing platform to:
based on the determination that the first modification of the one or more account settings modifications applies to the account settings corresponding to the detected interaction, compute a likelihood of acceptance score indicating a likelihood of acceptance of the first modification by the first individual.

9. The computing platform of claim 8, wherein the memory stores additional computer-readable instructions that, when executed by the at least one processor, further cause the computing platform to:
compare the likelihood of acceptance score to a first predetermined threshold, wherein sending the one or more commands directing the enterprise data source to modify the initial account settings based on the first modification is based on a determination that the likelihood of acceptance score exceeds the first predetermined threshold.

10. The computing platform of claim 9, wherein the memory stores additional computer-readable instructions that, when executed by the at least one processor, further cause the computing platform to:
monitor the event processing system to detect a second interaction by the first individual;
based on the second detected interaction, compare account settings corresponding to the second detected interaction to the one or more account settings modifications, wherein the comparison of the account settings corresponding to the second detected interaction to the one or more account settings modifications results in a determination that a second modification of the one or more account settings modifications applies to the account settings corresponding to the second detected interaction;
based on the determination that the second modification of the one or more account settings modifications applies to the account settings corresponding to the second detected interaction, compute a second likelihood of acceptance score indicating a likelihood of acceptance of the second modification by the first individual;
determine that the second likelihood of acceptance score does not exceed the first predetermined threshold;
based on the determination that the second likelihood of acceptance score does not exceed the first predetermined threshold, compare the second likelihood of acceptance score to a second predetermined threshold;
based on a determination that the second predetermined threshold is exceeded, send one or more commands directing a user device corresponding to the first individual to display a prompt requesting permission to perform the second modification, wherein sending the one or more commands directing the user device corresponding to the first individual to display the prompt requesting the permission to perform the second modification causes the user device corresponding to the first individual to display the prompt requesting the permission to perform the second modification; and
based on a determination that the second predetermined threshold is not exceeded, determine that the second modification should not be performed.

11. The computing platform of claim 1, wherein the memory stores additional computer-readable instructions that, when executed by the at least one processor, further cause the computing platform to:
monitor the enterprise data source to identify input of initial account settings for the first individual of the plurality of individuals; and
identify, using an identity of the first individual and a settings optimization model, the enterprise account data and the third party source data for the first individual, wherein the settings optimization model is trained by the computing platform using the enterprise account data and the third party source data for the plurality of individuals.

12. The computing platform of claim 1, wherein the one or more account settings modifications are further based on the third party source data for the first individual, wherein the third party source data indicates a lack of enrollment in a particular service, and wherein the one or more account settings modifications comprise enrolling the first individual in the particular service.

13. The computing platform of claim 1, wherein the one or more account settings modifications are further based on the enterprise account data for the first individual, indicating an investment risk profile for a particular account of the first individual, and wherein the one or more account settings modifications comprise adjusting privacy settings for a different account of the first individual based on the investment risk profile.

14. The computing platform of claim 1, wherein modifying the initial account settings further includes modifying account settings for a second application, different than a first application, and wherein monitoring the event processing system to detect the interaction by the first individual comprises detecting an interaction in the first application.

15. A method comprising:
at a computing platform comprising at least one processor, a communication interface, and memory:
identifying, by inputting enterprise account data and third party source data for a first individual into a settings optimization model, a subset of a plurality of individuals having common characteristics with the first individual;
identifying, using the settings optimization model, one or more discrepancies between initial account settings for the first individual and account settings for the subset of the plurality of individuals, wherein the account settings for the subset of the plurality of individuals are included in the enterprise account data for the plurality of individuals;
identifying, based on the one or more discrepancies between the initial account settings for the first individual and the account settings for the subset of the plurality of individuals, one or more account settings modifications for the first individual, wherein the setting optimization model is further configured to identify investment recommendations, based on an identified risk tolerance for the first individual, and wherein identifying the investment recommendations comprises:
identifying that the first individual has applied maximum privacy settings to an account,
identifying, based on the maximum privacy settings, that the first individual is risk averse, and
generating a recommendation to shift from a higher risk investment to a lower risk investment;
monitoring an event processing system to detect an interaction by the first individual;
based on the detected interaction, comparing account settings corresponding to the detected interaction to the one or more account settings modifications, wherein the comparison of the account settings corresponding to the detected interaction to the one or more account settings modifications results in a determination that a first modification of the one or more account settings modifications applies to the account settings corresponding to the detected interaction; and
sending one or more commands directing an enterprise data source to modify the initial account settings based on the first modification, wherein sending the one or more commands directing the enterprise data source to modify the initial account settings based on the first modification causes the enterprise data source to modify the initial account settings based on the first modification.

16. The method of claim 15, further comprising:
sending, to the enterprise data source, a request for the enterprise account data for the plurality of individuals; and
receiving, from the enterprise data source, the enterprise account data for the plurality of individuals, wherein the enterprise account data comprises privacy settings for online banking accounts for the plurality of individuals.

17. The method of claim 16, further comprising:
sending, to a third party data source, a request for the third party source data for the plurality of individuals; and
receiving, from the third party data source, the third party source data for the plurality of individuals.

18. The method of claim 17, wherein the third party source data comprises one or more of: social media privacy settings, device privacy settings, privacy settings for an application, or privacy settings for another website.

19. The method of claim 15, wherein the initial account settings comprise privacy settings for an online banking account.

20. One or more non-transitory computer-readable media storing instructions that, when executed by a computing platform comprising at least one processor, a communication interface, and memory, cause the computing platform to:

identify, by inputting enterprise account data and third party source data for a first individual into a settings optimization model, a subset of a plurality of individuals having common characteristics with the first individual;

identify, using the settings optimization model, one or more discrepancies between initial account settings for the first individual and account settings for the subset of the plurality of individuals, wherein the account settings for the subset of the plurality of individuals are included in the enterprise account data for the plurality of individuals, wherein the setting optimization model is further configured to identify investment recommendations, based on an identified risk tolerance for the first individual, and wherein identifying the investment recommendations comprises:

identifying that the first individual has applied maximum privacy settings to an account,
  identifying, based on the maximum privacy settings, that the first individual is risk averse, and
  generating a recommendation to shift from a higher risk investment to a lower risk investment;

identify, based on the one or more discrepancies between the initial account settings for the first individual and the account settings for the subset of the plurality of individuals, one or more account settings modifications for the first individual;

monitor an event processing system to detect an interaction by the first individual;

based on the detected interaction, compare account settings corresponding to the detected interaction to the one or more account settings modifications, wherein the comparison of the account settings corresponding to the detected interaction to the one or more account settings modifications results in a determination that a first modification of the one or more account settings modifications applies to the account settings corresponding to the detected interaction; and send one or more commands directing an enterprise data source to modify the initial account settings based on the first modification, wherein sending the one or more commands directing the enterprise data source to modify the initial account settings based on the first modification causes the enterprise data source to modify the initial account settings based on the first modification.

* * * * *